United States Patent [19]
Martin

[11] Patent Number: 5,439,368
[45] Date of Patent: Aug. 8, 1995

[54] KNOCKOUT ROD ASSEMBLY FOR MOLD

[75] Inventor: Roger G. Martin, Greenville, Mich.

[73] Assignee: Master Unit Die Products, Inc., Greenville, Mich.

[21] Appl. No.: 261,389

[22] Filed: Jun. 17, 1994

Related U.S. Application Data

[62] Division of Ser. No. 920,612, Jul. 27, 1992, Pat. No. 5,350,289.

[51] Int. Cl.⁶ .......................................... B29C 33/00
[52] U.S. Cl. .................................. 425/190; 264/334; 425/556; 425/444; 425/192 R
[58] Field of Search .................... 264/328.1, 334; 425/190, 192 R, 444, 554, 556, 574

[56] References Cited
U.S. PATENT DOCUMENTS

| | | | |
|---|---|---|---|
| 4,009,979 | 3/1977 | Martin | 425/444 |
| 4,158,910 | 6/1979 | Hanas et al. | 425/183 |
| 4,202,522 | 5/1980 | Hanas et al. | 425/192 R |
| 4,348,165 | 9/1982 | Vostrovsky | 425/190 |
| 4,416,604 | 11/1983 | Bender et al. | 425/190 |
| 4,472,127 | 9/1984 | Cyriax et al. | 425/190 |
| 4,500,274 | 2/1985 | Cyriax et al. | 425/190 |
| 4,500,275 | 2/1985 | Ruhl | 425/192 R |
| 4,714,421 | 12/1987 | D'Aostino | 425/192 R |
| 4,767,302 | 8/1988 | Okamoto et al. | 425/574 |
| 4,776,783 | 10/1988 | Pelle et al. | 425/190 |
| 4,793,785 | 12/1988 | Osada | 425/190 |
| 4,805,285 | 2/1989 | Reyes | 425/193 |
| 4,861,254 | 8/1989 | Takeuchi et al. | 425/190 |
| 4,867,668 | 9/1989 | Miyairi | 425/192 R |
| 4,874,308 | 10/1989 | Atlas et al. | 425/556 |
| 4,888,252 | 12/1989 | Kilim | 425/190 |
| 4,929,166 | 5/1990 | DiSimone et al. | 425/190 |
| 4,959,002 | 9/1990 | Pleasant | 425/444 |
| 5,012,568 | 5/1991 | DiSimone et al. | 425/192 R |
| 5,033,784 | 7/1991 | Martin | 294/91 |
| 5,096,404 | 3/1992 | Janos et al. | 425/190 |
| 5,227,178 | 7/1993 | Rieker | 425/556 |

FOREIGN PATENT DOCUMENTS

| | | | |
|---|---|---|---|
| 62-99126 | 5/1987 | Japan | 425/190 |
| 3-43225 | 2/1991 | Japan | 425/556 |
| 4-232716 | 8/1992 | Japan | 425/556 |
| 0804471 | 2/1981 | U.S.S.R. | 425/556 |
| 0810505 | 3/1981 | U.S.S.R. | 425/556 |
| 1493488 | 7/1989 | U.S.S.R. | 425/556 |
| 1597281 | 10/1990 | U.S.S.R. | 425/556 |

Primary Examiner—C. Scott Bushey
Attorney, Agent, or Firm—Price, Heneveld, Cooper, Dewitt & Litton

[57] ABSTRACT

A knockout rod assembly is provided for activating an ejector plate in a mold base. The knockout rod assembly includes an ear plate adapted to attach to the back surface of an ejector half of a mold base. The ear plate has a pattern of apertures therein and at least one push rod is extended through the apertures in the ear plate and through the back of the mold base for attachment to the ejector plate. Also, at least one push/pull rod is extended through an aperture in the ear plate and the back of said mold base for attachment to said ejector plate, the push/pull rod including a locking surface at one end. A knockout rod is attached to the knockout rod assembly for moving the push rod and the ejector plate, and a push/pull knockout rod is attached to the knockout rod assembly for pushing and pulling the push/pull rod attached to the ejector plate. The push/pull knockout rod lockingly attaches to the locking member of the push/pull rod.

7 Claims, 6 Drawing Sheets

KNOCKOUT ROD ASSEMBLY FOR MOLD

This is a divisional application of application, Ser. No. 07/920,612, filed on Jul. 27, 1992, entitled QUICK CHANGE SYSTEM FOR MOLD BASES, now U.S. Pat. No. 5,350,289.

BACKGROUND OF THE INVENTION

An injection molding machine operates so rapidly that it can quickly finish a run of a particular molded part in a comparatively short period of time. In view of the substantial cost of the machine, it cannot be allowed to sit idle. The mold base in the machine has to be removed and a new mold base inserted so that the machine can continue to operate. The time taken in changing the mold base must be limited so the machine can again begin productive use. It currently takes from one to several hours to complete a mold base change. This lost time has a marked effect on the profitability of a company.

In order to speed up the mold change process, attempts have been made to equip the platens of the molding machines with an array of clamps and guides for supporting the mold base. For example, U.S. Pat. No. 4,500,274 issued to Cyriax et al. discloses a quick change mold assembly employing a plurality of spaced hydraulic clamps mounted on each platen of the press. Spaced guides are provided for receiving a plate attached to the back of a mold half. The clamps and guides are fastened directly to the platens. In order to add these parts, the press has to be disassembled so that the face of the platen can be drilled and tapped. There is no convenient way for machining the platen in the machine. After the platen is prepared, the clamps and guides are attached and the platen is reinstalled in the machine. This clearly involves a great expense which is limited to the particular machine. If the machine breaks or is down for service, the clamps and guides are not readily transferable to another machine. The use of many discrete guides and clamps on the platen face for supporting the mold base also compounds the problem of damage to the molding machine due to pieces of metal falling into the machine.

U.S. Pat. No. 4,714,421 issued to D'Agostino discloses a quick change system for mold bases having a T-shaped plate recessed in and attached to the back of each mold half. On the ejector side of the press, the entire ejector assembly is contained within a large clamp plate. The T-shaped plates are not readily interchangeable between mold bases. Also, the large clamp plate attached to the ejector side of the mold base limits the amount of available mold space in the injection molding machine.

The problem of changing mold bases is not limited to injection molding machines. Similar problems are presented in changing the die or mold in a stamping press. In both situations, the mold set weighs a substantial amount and must be handled carefully to avoid damage to the mold, die and press.

At the present time, there does not appear to be a simple system for interchanging mold bases in less than one hour. Also, there does not appear to be a simple system that would allow many different size mold bases to be equipped with a common ear plate which would enable the mold bases to be readily changed in a molding press.

SUMMARY OF THE INVENTION

In accordance with the present invention, a quick change system is provided for mold bases employing adapter frames which are attached to the platens of the molding machine. The adapter frames are readily transferable from machine to machine using the existing mounting hole patterns on the platens of the machines. The mold bases are supported on ear plates which are adapted to support many different size mold bases. The ear plates are also readily transferable from adapter frame to adapter frame.

The adapter frames have a U-shaped guide and support channel for receiving the ear plates on the mold base. One or more T-shaped guide rollers are mounted in line with the entrance to each side of the guide channel. The T-shape configuration for the guide rollers enables the edge of the ear plate to roll along the vertical portion of the "T" while the larger horizontal portion of the "T" captures the ear plate, keeping the ear plate in line with the guide channel on the adapter frame.

The adapter frames are attached to the platen faces using the existing standard threaded hole pattern on the platen face. Clamps can be used for the initial installation of the adapter frame. The clamps are preferably removed after bolts or cap screws, or the like, are used to fasten the adapter plates to the face of the platen. When the ear plate is inserted into the adapter frame, all of the fasteners are covered, eliminating a potential source of damage during the operation of the machine.

The quick change system of the present invention allows mold bases, equipped with standard ear plates, to be changed in a press in ten minutes, or even less time.

DETAILED DESCRIPTION OF THE PREFERRED EMBODIMENTS

Figure 1:
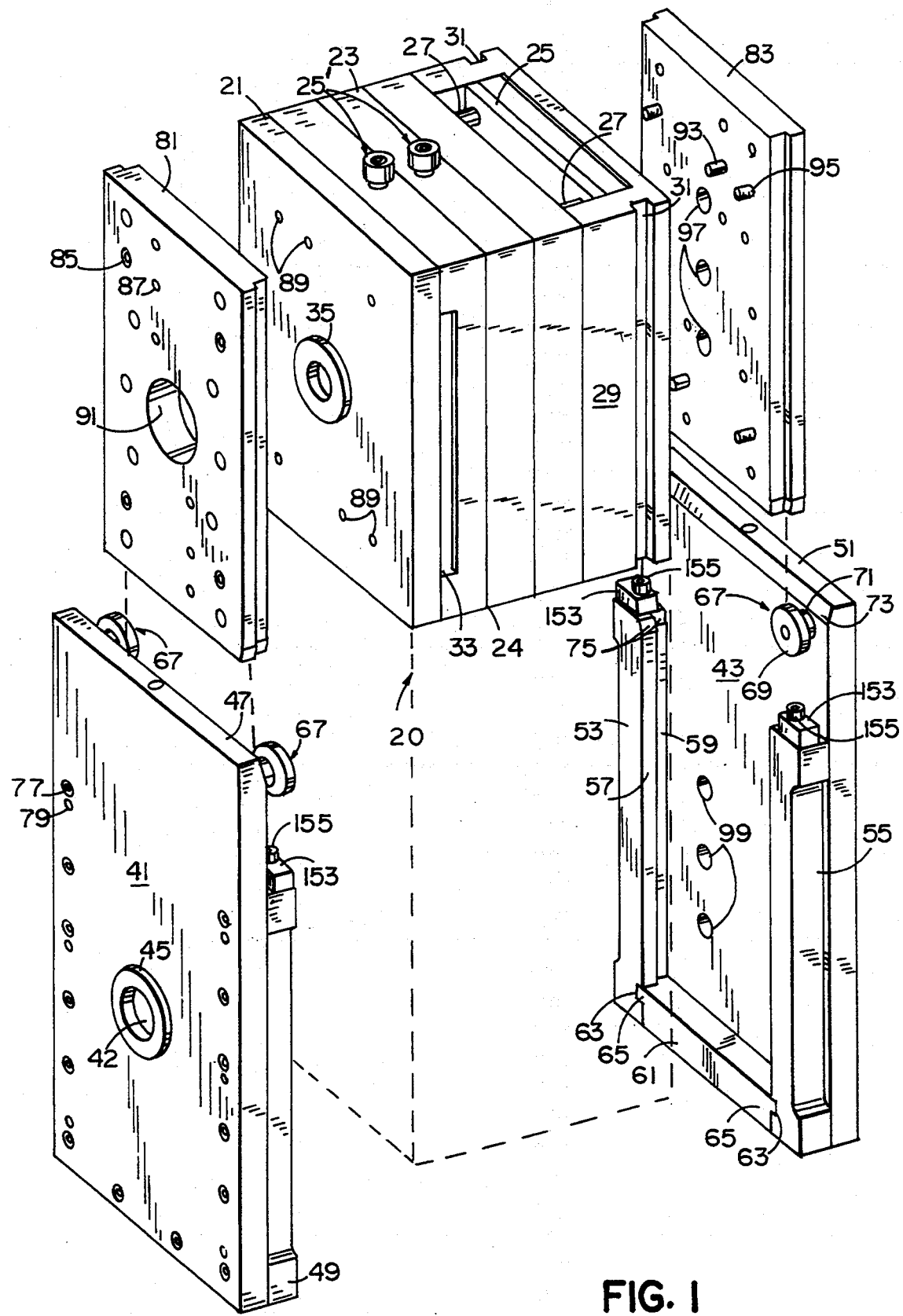
FIG. 1 is an exploded view showing the several components making up the quick change system of the present invention.

Referring to FIG. 1, a standard mold base is indicated generally by the number 20. The mold base has a cavity side 21 and an ejector side 23 which can separate along parting line 24. The ejector half of the mold base has an ejector plate 25 joining spaced ejector pins 27. The ejector assembly, including ejector plate 25 and ejector pins 27, is enclosed within an elongated, substantially U-shaped, clamp plate 29, which has a recess 31 along each side for clamps which can be used to attach the clamp plate to the platen of a press. A pair of lifting buttons 25 are attached to the top of cavity mold half 21 and ejector mold half 23. Cavity mold half 21, like ejector mold half 23, has a recessed portion 33 for clamps which can be used to clamp the cavity mold half to the platen of an injection molding machine. An alignment ring 35 is attached to the cavity mold half.

As thus far described, mold base 20 is a standard mold base. A mold base of this type is typically held in the injection molding machine by a plurality of clamps which grip the mold base in recesses 31 and 33 and hold the mold base in position in the injection molding machine. In order to change this mold base for a larger or smaller mold base, it is necessary to loosen all of the clamps and then carefully lift the mold base from the machine without allowing it to damage any of the clamps or the platen of the machine.

In accordance with the present invention, a pair of adapter plates 41 and 43 are attached to the faces of the platens of the injection molding machine. Cavity half adapter frame 41 has an aperture 42 which can align with ring 35 on the standard mold base. The aperture is bounded by an alignment ring 45. The adapter frame has a base plate 47 upon which are mounted along each edge a guide rail member 49, only one of which is shown.

Adapter plate 43, also called an ejector frame plate, has a substantially rectangular base plate 51 which has supported on its face a pair of guide rail members 53 and 55. Each of the guide rail members has an overhanging edge portion 57 which forms a recess or groove 59 between the overhanging edge and the face of base plate 51. A stop member 61 is attached at a lower edge of base plate 51. Guide rails 53 and 55 each have a slot 63 for receiving a projecting tongue or key 65 at each end of stop member 61. Guide rails 53 and 55 and stop member 61 provide a guide channel on the surface of ejector adapter plate 43. A similar channel is formed on the face of cavity half adapter frame 41.

Figure 5:
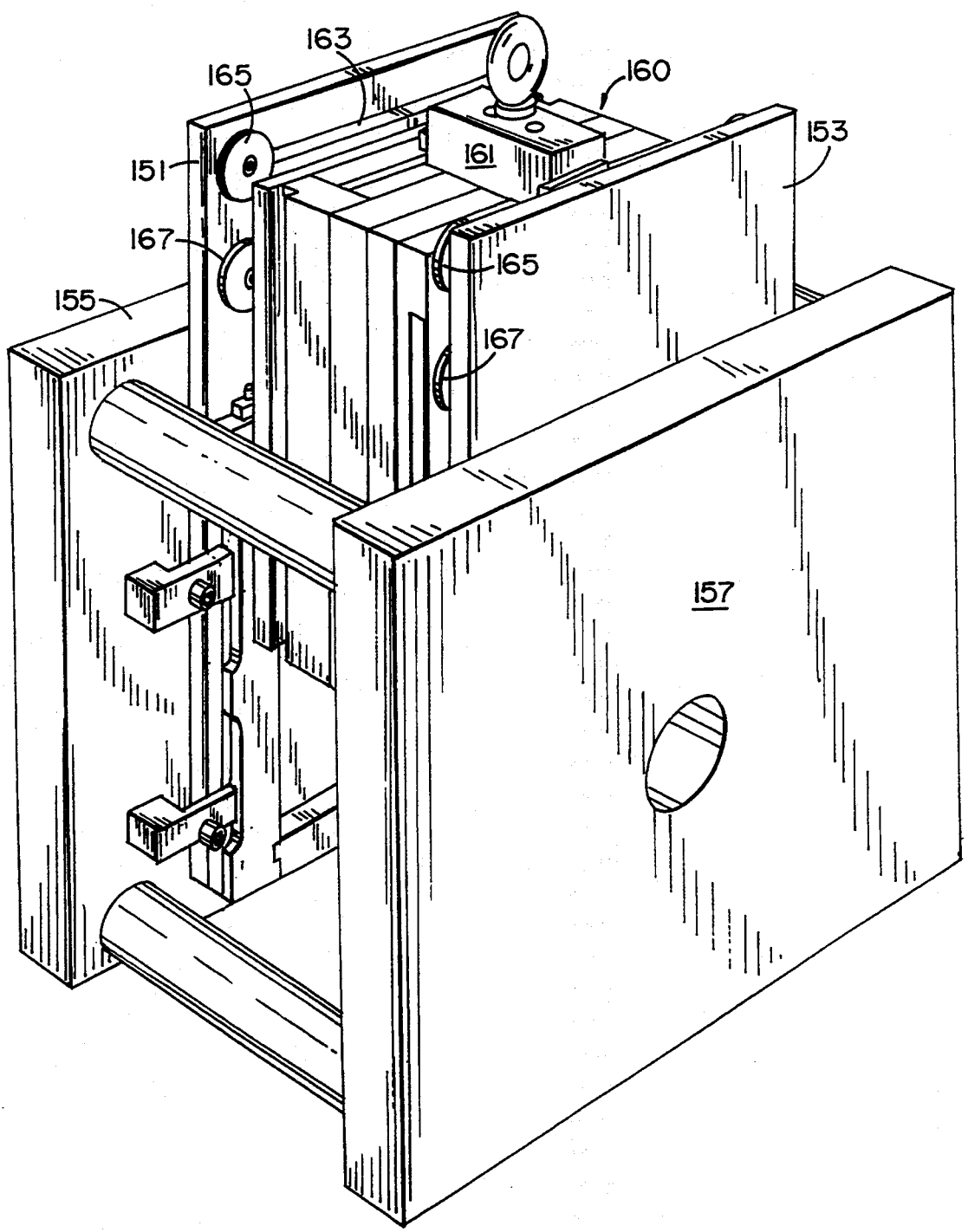
FIG. 5 is a perspective view showing a mold base equipped with ear plates being lowered into an adapter frame plate equipped with two sets of guide rollers.

A pair of T-shaped rollers 67 are mounted near the upper edge of base plates 47 and 51. Each of the rollers has an enlarged or horizontal T-arm 69 connected to a narrow roller surface 71. Only one roller is shown on ejector adapter plate 43. A similar roller would be in the upper left-hand corner, as shown in FIG. 1. Also, more than one pair of guide rollers can be used as shown in FIG. 5. Similar rollers 67 are positioned near the upper edge of cavity frame plate 41.

It should be noted in FIG. 1 that the upper edge 73 of base plate 51 is relieved approximately 5° as are the leading edges 75 of guide rail members 53 and 55. The top edge of base plate 47, along with the attached guide rails, are similarly relieved to facilitate entry of the ear plates into the guide channels on the adapter plates.

A plurality of apertures 77 and 79 are provided along the edge of each of the adapter frame plates for fasteners such as cap screws and dowels to position and align the guide rail members and the stop members.

Returning now to mold base 20, in the upper portion of FIG. 1, a pair of ear plates 81 and 83 are shown positioned adjacent to the rear surfaces of the cavity mold half and the ejector mold half of the mold base. The cavity half ear plate has a plurality of apertures for fasteners 85 and dowels 87 for attaching the ear plate to the standard aperture pattern 89 on the back surface of the cavity mold half. An aperture 91 is provided in ear plate 81 in alignment with alignment ring 35. Ear plate 83 has a similar pattern of apertures for dowels 93 and threaded fasteners 95 for attaching an ear plate to the back surface of the adapter mold half ejector clamp plate 29. Ejector ear plate 83 also has a row of apertures 97 through which knockout rods (not shown) can pass to move ejector plate 25 and ejector pins 27. A similar pattern of apertures 99 is provided in ejector adapter plate 43 for the passage of the knockout rods. The knockout rods pass through the platen of the injection molding machine, through apertures 99 in ejector adapter plate 43, to actuate ejector push rods accessible through apertures 97 in ejector ear plate 83.

Figure 2:
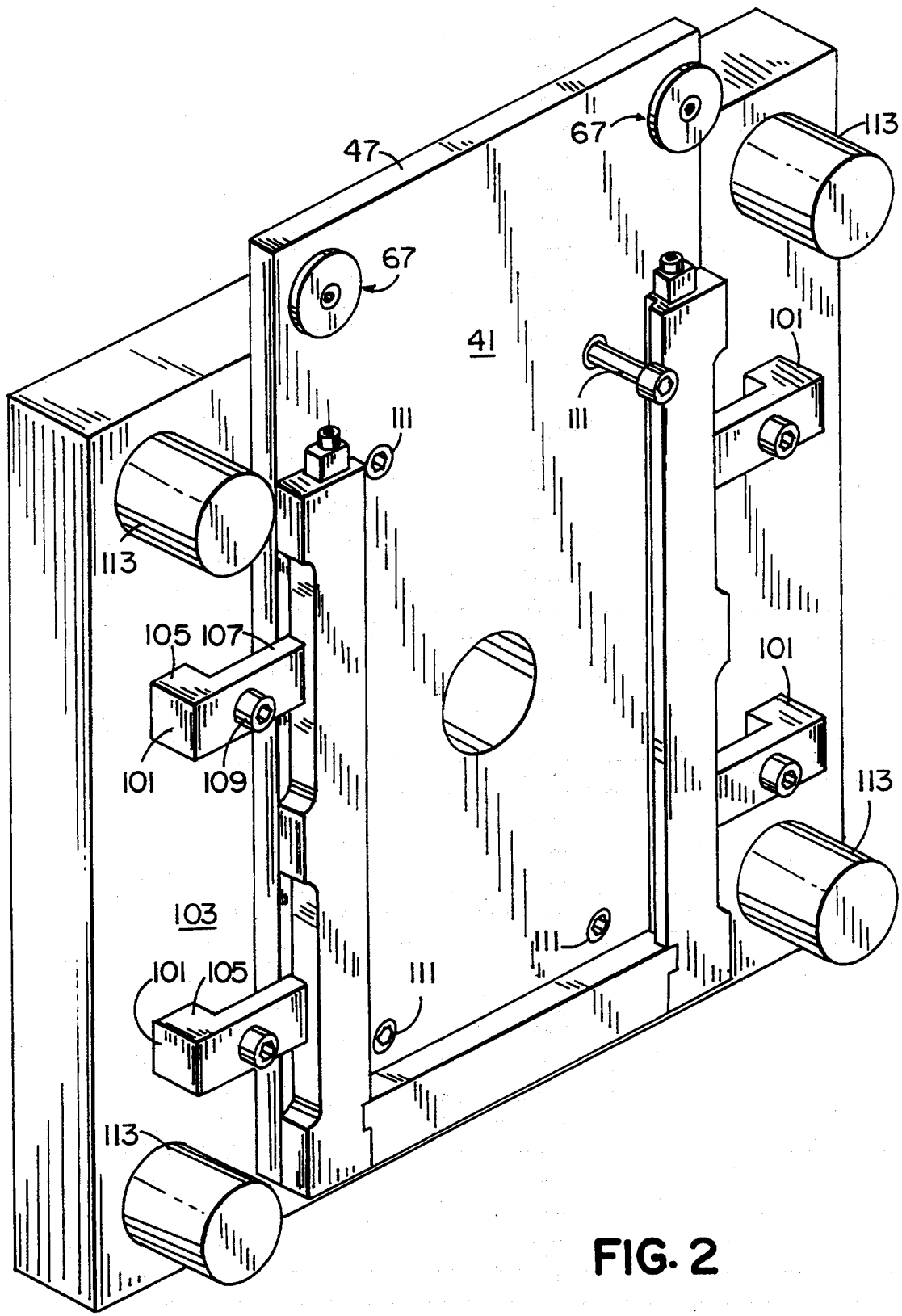
FIG. 2 is a perspective view of a cavity side adapter frame clamped to a press platen.

Adapter plates 41 and 43 are fastened directly to the platens of the injection molding machine. As shown in FIG. 2, cavity adapter plate 41 is held by a plurality of clamps 101 to the face of platen 103. Each clamp 101 has a riser portion 105 which spaces clamp portion 107 approximately the thickness of base plate 47. The clamp can be tightened in place by a screw, such as a cap screw 109, to hold the clamp and adapter plate in position. It is preferred to use fasteners such as cap screws 111 to hold the adapter plate in position on the face of platen 103. This is preferred in order to remove clamps 101 and screws 109 which might accidentally come lose and fall into the machine during the injection molding process. After the adapter plate is tightly fastened to the platen by screws 111, clamps 101 and clamp screws 109 can be removed from the platen and set aside until needed again for the removal of the adapter plate from the face of the platen. The tie bars 113 help to maintain proper alignment of the mold halves and also support the mass of the movable platen.

Figure 3:
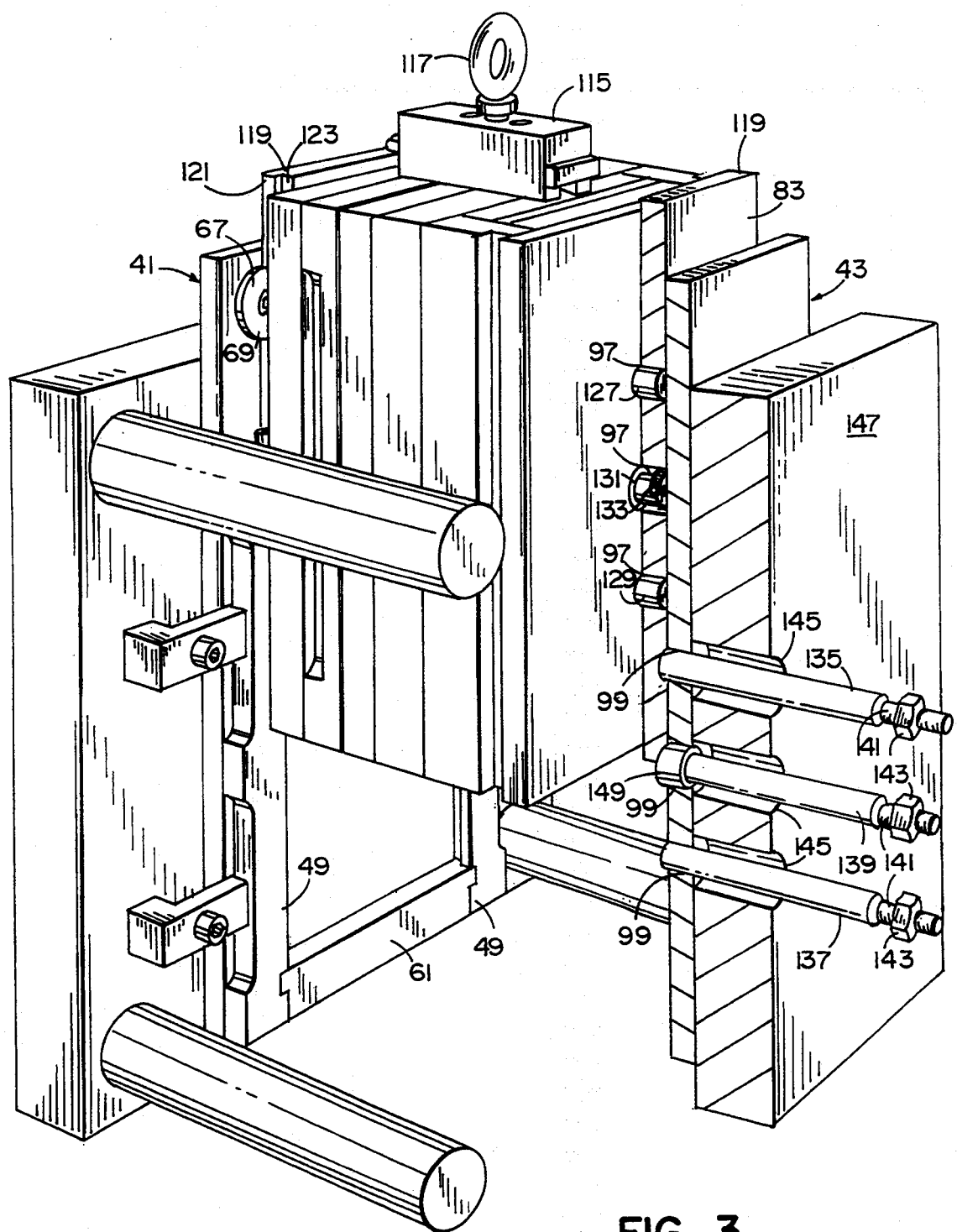
FIG. 3 is a perspective view, partially in section, showing a mold base being lowered into the supporting adapter frames and the knockout rods.

After ear plates 81 and 83 are attached to the back surfaces of the standard mold base 20 (FIG. 1), a mold balancing lifting bar 115 (FIG. 3) is slid over lifting buttons 25 on top of the mold base. The lifting bar can be moved back and forth, or to the left and right, as shown in FIG. 3, and lifted by means of a hook through ring 117 until the balance point of the mold is found where it hangs with the ear plates substantially perpendicular to the ground. Once the mold is precisely balanced, the position of the balancing and lifting bar can be marked on the top of the mold base with a scribe so that the lifting bar can be quickly positioned to lift the mold base. The mold balancing lifting bar is the subject of U.S. Pat. No. 5,033,784 issued Jul. 23, 1991, assigned to the same assignee as the present application.

The balanced mold base can be moved over to the injection molding machine and slid into adapter plates 41 and 43. Each edge of the ear plate is stepped at 119 and adapted to slide behind guide roller 67 which facilitates easy entrance of the ear plate into the adapter plate. The narrow portion of the guide roller or the center leg of the T-shaped guide roller contacts the edge 121 of the ear plate while the enlarged or horizontal T portion 69 of the guide roller contacts the recessed surface 123 of the ear plate and captures stepped portion of the ear plate underneath the edge of the guide roller. Using the T-shaped guide roller, the ear plate is not only captured as it is lowered into the adapter, it is also carefully guided, like a drawer in a fine piece of furniture, to the bottom of the channel defined by guide rails 49 and stop member 61 on the face of cavity side adapter plate 41.

Referring to FIG. 5, adapter plates 151 and 153 are shown attached to press platens 155 and 157. The adapter plates are preferably the largest adapter plates that will fit in the machine, enabling many different size mold bases to be used. A standard mold base 160 is supported by mold balancing and lifting bar 161, a supporting hook is not shown. An ear plate 163 is attached to the ejector side of the mold base. A similar ear plate (not shown) is attached to the cavity side of the mold base. Each adapter plate has an entry pair of guide rollers 165, only one of which is shown, on each adapter plate and a lower pair of guide rollers 167, only one of which is shown, on each adapter plate. The two pair of guide rollers facilitate the entry of the ear plates into the guide channel on each adapter plate. The ear plates are captured by the guide rollers and aligned before being lowered into the guide channel.

In order to activate the ejector mechanism in the mold base (FIG. 3), three connecting rods are provided for attachment to ejector plate 25 (FIG. 1). A top push rod 127, a bottom push rod 129 and a center push/pull ejector rod 131 are attached to ejector plate 25. The most convenient way for attaching the three rods is by threading the ends of the rods into threaded apertures in the ejector plate. Push/pull rod 131 has a pair of spaced ears, or projections, 133 along one face. Each of the ejector rods moves in apertures 97 provided in ear plate 83. Each of the rods is machined and mounted in the ejector plate so that the ends of the rods are substantially flush with the surface of ear plate 83 so that they will not interfere with the insertion and removal of the mold base from adapter plate 43.

It should be noted that while three knockout rods are shown in FIG. 3, a particular mold base may require fewer or more knockout rods. Regardless of the number of knockout rods used, they would be handled in a similar manner.

An injection molding machine is usually equipped with a hydraulic knockout mechanism. Three knockout rods are provided for attachment to this hydraulic knockout mechanism, a top push rod 135, a bottom push rod 137 and a center push/pull rod 139. Each of the knockout rods has a long threaded end portion 141 for attachment to the knockout mechanism. A threaded nut 143 is provided on each knockout rod for-locking the rods to the hydraulic assembly in the injection molding machine. Each of the knockout rods passes through an aperture 99 in adapter plate 43. The knockout rods also pass through apertures 145 in platen 147.

Figure 4:
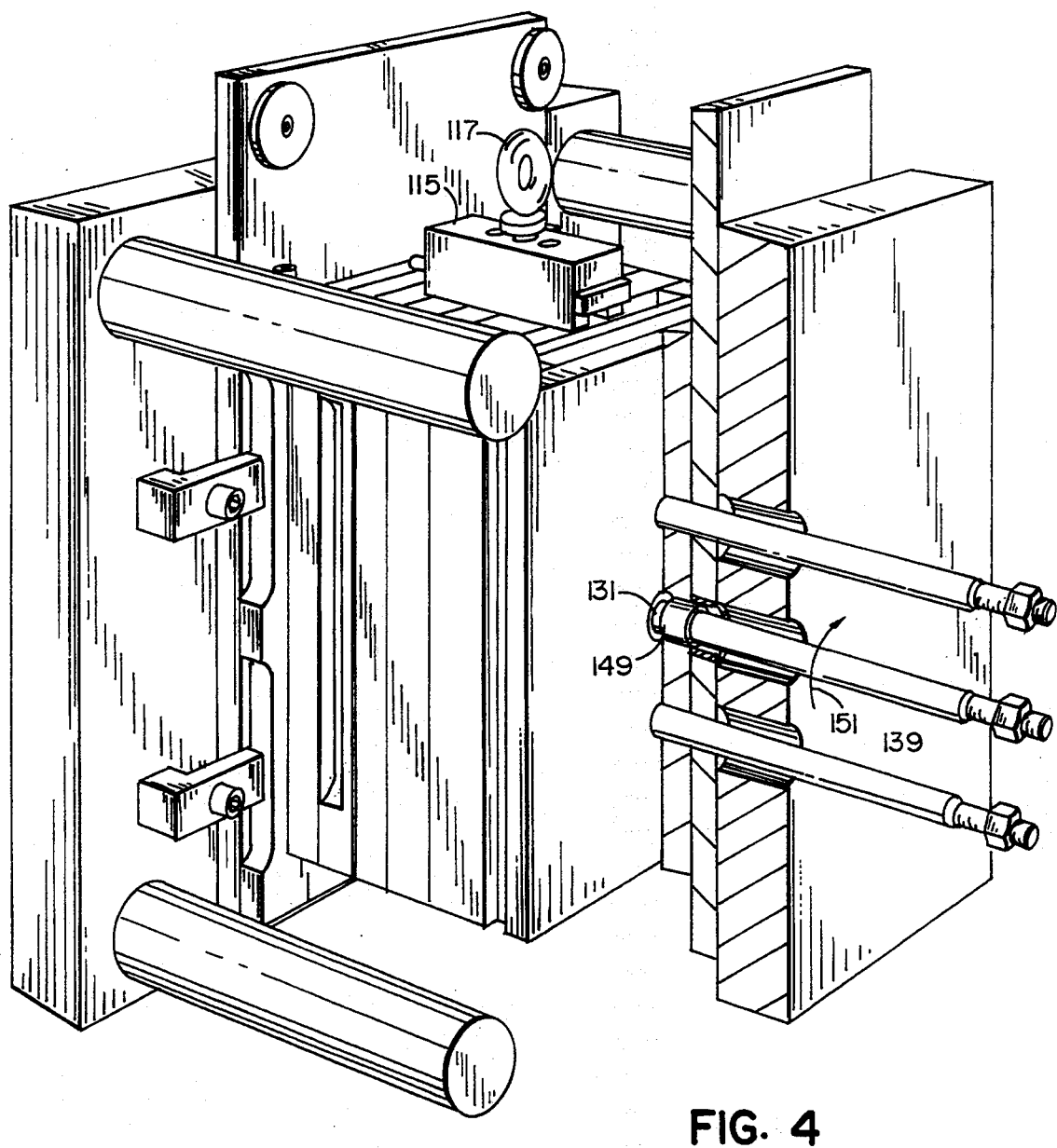
FIG. 4 is a perspective view showing the mold base of FIG. 4 in the adapter frames and with the push/pull knockout rod being twisted to lock the knockout rod to the push/pull rod attached to the ejector plate in the mold base.

Center push/pull knockout rod 139 has a locking collar 149 which can pass over the projecting ear portions 133 on push/pull rod 131 and on being given a half twist, as shown in FIG. 4 by arrow 151, coupling 149 will no longer be able to pass over ear portions 133 and push/pull rod 131 and knockout rod 139 will be locked together for positive forward and reverse motion of ejector plate 25.

When it is desired to remove a mold base from the injection molding machine (FIG. 4), knockout rod 139 would be turned in the direction opposite arrow 151 to disconnect locking collar 149 from push/pull rod 131. Mold balance lifting bar 115 would then be slid over the lifting buttons on the top of the mold base and aligned with the balance mark previously made on the top of the mold base. Clamps 153 (FIG. 1), would then be released by loosening screws 155. The clamps would then be moved out of the way of the edge of the ear plates. A hook can then be passed through ring 117 and the balanced mold base can be lifted straight out of the adapter plates. If another mold base is equipped with similar ear plates, the same balance lifting bar 115 and I-ring 117 can be used to lower the second mold base into the machine. Knockout rod 139 would be given a half twist to connect the knockout rod and push/pull rod 131 together. Clamps 153 would then be fastened to the edges of the ear plates on the mold base and the molding machine would be ready to make a different part. Using the adapter plates and ear plates of the present invention, a mold base can be changed in as little as ten minutes.

Figure 6:
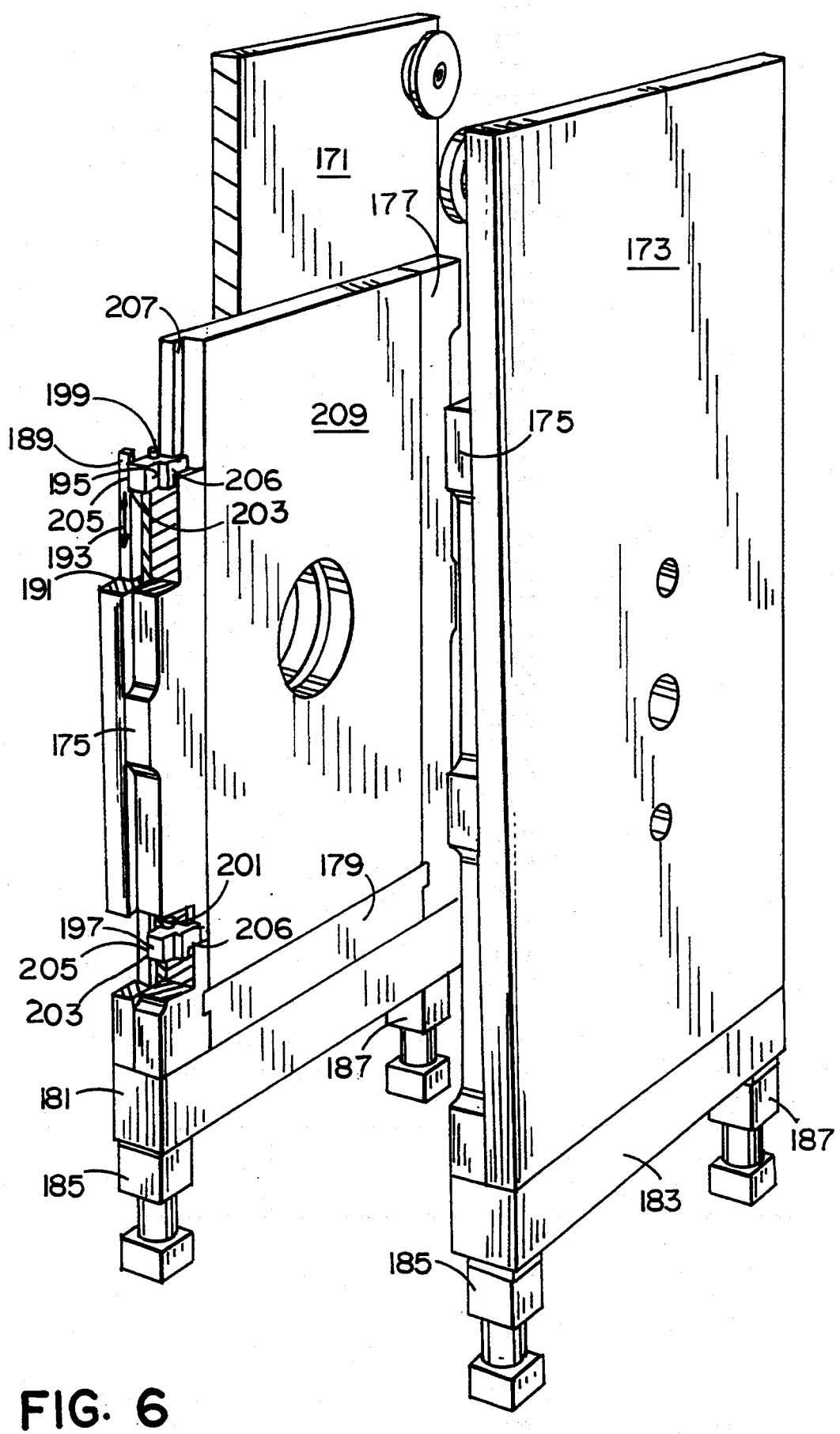
FIG. 6 is a perspective view showing adapter frames with powered clamps for gripping the ear plates attached to a mold base.

In order to further speed up the mold changing process, referring to FIG. 6, each of the adapter plates 171 and 173 can be equipped with powered clamps to hold the ear plates and supported mold bases in place. The powered clamps on each adapter plate are substantially identical so only one set will be described in detail.

Adapter plate 171 has guide rails 175 and 177, and a stop member 179, which form a guide channel on the face of the adapter plate. Base members 181 and 183 in the machine support the adapter frame plates.

A pair of extensible cylinders 185 and 187 are attached to the bottom of base members 181 and 183 in alignment with guide rails 175 and 177. The extensible cylinders can be pneumatic or hydraulic. A vertical clamp actuating member 189 is guided in a passage 191 in each guide rail and is moved up and down by the cylinders, as indicated by arrow 193.

Clamp members 195 and 197 are pivotally mounted on pivot pins 199 and 201 within guide member 175. Each clamp member has a cam follower face 203 which is in contact with spaced cam surfaces 205 on clamp actuating member 189. Each clamp member has a clamping portion 205 for holding the stepped edge 207 of ear plate 209. The clamp portions 206 are closely spaced to the stepped edge of the ear plate and only have to move approximately 0.010–0.015 inch to clamp against the ear plate.

When the powered clamps are used, the press operator does not have to climb a ladder to loosen clamps 153 (FIG. 1) and to retighten the clamps after a new mold base is in position. The press operator merely has to operate a switch (not shown) to raise or lower clamp actuating member 189 to cause the clamps to grip or release the edge of the ear plates simplifying the mold base change process.

The adapter plates can be easily transferred to other machines since the standard mounting points on the machine platens are used to fasten the adapter plates. No special hardware is required. Selecting the largest adapter frames that fit a machine allows the use of standard mold bases up to the machine's maximum capability.

Although the invention has been described with respect to specific preferred embodiments thereof, many variations and modifications will become apparent to those skilled in the art. It is, therefore, the intention that the appended claims be interpreted as broadly as possible in view of the prior art to include all such variations and modifications.

The embodiments of the invention in which an exclusive property or privilege is claimed are defined as follows:

1. A knockout rod assembly for activating art ejector plate in a mold base comprising:
    an ear plate for attachment to a back surface of an ejector half of a mold base, said ear plate having a pattern of apertures therein;
    at least one push rod for extending through an aperture in said ear plate and a back of said mold base for attachment to said ejector plate;

at least one push/pull rod for extending through an aperture in said ear plate and the back of said mold base for attachment to said ejector plate;

a locking surface at the end of said push/pull rod;

at least one knockout rod for attachment to the knockout assembly in a press for moving said push rod and said ejector plate;

a push/pull knockout rod for attachment to the knockout assembly in a press for pushing and pulling said push/pull rod attached to said ejector plate in said mold base; and a locking member on said push/pull knockout rod for locking to said locking surface at the end of said push/pull rod.

2. A knockout rod assembly as set forth in claim 1, wherein said locking member on said push/pull knockout rod is a twist lock which engages said locking surface on said push/pull rod.

3. A knockout rod assembly as set forth in claim 1, wherein said locking surface on said push/pull rod is at least one raised surface.

4. A knockout rod assembly as set forth in claim 3, wherein said locking surface on said push/pull rod is a pair of ears extending from opposite sides of said push/pull rod.

5. A knockout rod assembly as set forth in claim 1, wherein said at least one push rod and said at least one push/pull rod are positioned substantially flush with an outer surface of said ear plate to facilitate entry of said ear plate into an adapter plate.

6. A knockout rod assembly as set forth in claim 1, wherein said at least one knockout rod and said push/pull knockout rod are mounted substantially flush with an outer surface of an adapter plate mounted on a surface of a machine platen to facilitate entry of an ear plate into said adapter plate.

7. A knockout rod assembly as set forth in claim 4, wherein said locking member on said push/pull knockout rod is configured to pass over said projecting ears on said push/pull rod and to reversibly turn to a position where it grips said ears.

* * * * *